US006779176B1

(12) United States Patent
Chambers, II et al.

(10) Patent No.: US 6,779,176 B1
(45) Date of Patent: Aug. 17, 2004

(54) METHODS AND APPARATUS FOR UPDATING ELECTRONIC SYSTEM PROGRAMS AND PROGRAM BLOCKS DURING SUBSTANTIALLY CONTINUED SYSTEM EXECUTION

(75) Inventors: Robert Baxter Chambers, II, Palmyra, VA (US); Abdulaziz M. Ibrahim, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/460,370

(22) Filed: Dec. 13, 1999

(51) Int. Cl.[7] .................................................. G06F 9/44
(52) U.S. Cl. ........................ 717/169; 717/175; 718/100; 700/95
(58) Field of Search ............................... 717/168–178, 717/122; 718/100, 106; 709/200–205, 217–221; 719/319–327; 713/1–2, 100; 700/1, 95

(56) References Cited

U.S. PATENT DOCUMENTS

| 4,530,054 A | * | 7/1985 | Hamstra et al. ............ 365/228 |
| 5,359,730 A | * | 10/1994 | Marron ........................ 709/100 |
| 5,699,275 A | * | 12/1997 | Beasley et al. .............. 709/221 |
| 5,873,097 A | | 2/1999 | Harris et al. |
| H001804 H | * | 9/1999 | Browning et al. ........... 455/560 |
| 5,948,104 A | | 9/1999 | Gluck et al. |
| 5,978,916 A | | 11/1999 | Randall |
| 6,044,461 A | | 3/2000 | Agha et al. |
| 6,052,761 A | | 4/2000 | Hornung et al. |
| 6,201,488 B1 | * | 3/2001 | Sato et al. ................... 341/106 |
| 6,240,550 B1 | | 5/2001 | Nathan et al. |
| 6,256,723 B1 | * | 7/2001 | Hudson et al. ............. 711/129 |
| 6,301,710 B1 | | 10/2001 | Fujiwara |
| 6,347,396 B1 | * | 2/2002 | Gard et al. .................... 707/10 |

* cited by examiner

Primary Examiner—Antony Nguyen-Ba
(74) Attorney, Agent, or Firm—Karl A. Vick, Esq.; Armstrong Teasdale LLP

(57) ABSTRACT

A method of implementing program updates in an electronic system includes requesting the system to accept a program update and loading replacement programs for execution. The method includes using an operating system to determine when programs running on an electronic system have finished an execution cycle and then commencing the replacement process.

27 Claims, 4 Drawing Sheets

METHODS AND APPARATUS FOR UPDATING ELECTRONIC SYSTEM PROGRAMS AND PROGRAM BLOCKS DURING SUBSTANTIALLY CONTINUED SYSTEM EXECUTION

BACKGROUND OF THE INVENTION

This invention relates generally to control systems and more specifically to industrial control systems that use embedded programs as a part of an industrial control system.

Known electronic systems are extensively used in process control applications. These electronic systems are usually modular, that is, a central processing unit (CPU) communicates with a series of replaceable modules, sometimes called input/output (I/O) modules that are connected to the CPU in a bus arrangement. I/O modules are configured with a common interface to the electronic system. In addition, specific input/output circuitry is contained within a particular I/O module depending on the function performed (i.e. the specific input/output requirements of a particular industrial control application). In one aspect of industrial control, the CPU monitors inputs and outputs from various I/O modules.

Typical electronic systems, such as those used in industrial control applications execute a plurality of program blocks, as part of an integrated control system. A typical integrated control system contains multiple modules used to control various hardware interfaces. One problem with electronic systems of this type is that when it is necessary to update a program block, the electronic system has to be stopped, even though the program block to be updated is not executing. Stopping the electronic system also means that the process being controlled, an assembly line for example, has to be stopped.

BRIEF SUMMARY OF THE INVENTION

It would therefore be desirable to provide a method where program blocks can be updated without stopping execution of other program blocks within the electronic system or the stopping of the entire electronic system.

In an exemplary embodiment of the invention, a method of implementing program updates in an electronic system is described. The method includes requesting the system to accept a program update and loading replacement programs for execution.

DETAILED DESCRIPTION OF THE INVENTION

Figure 1:
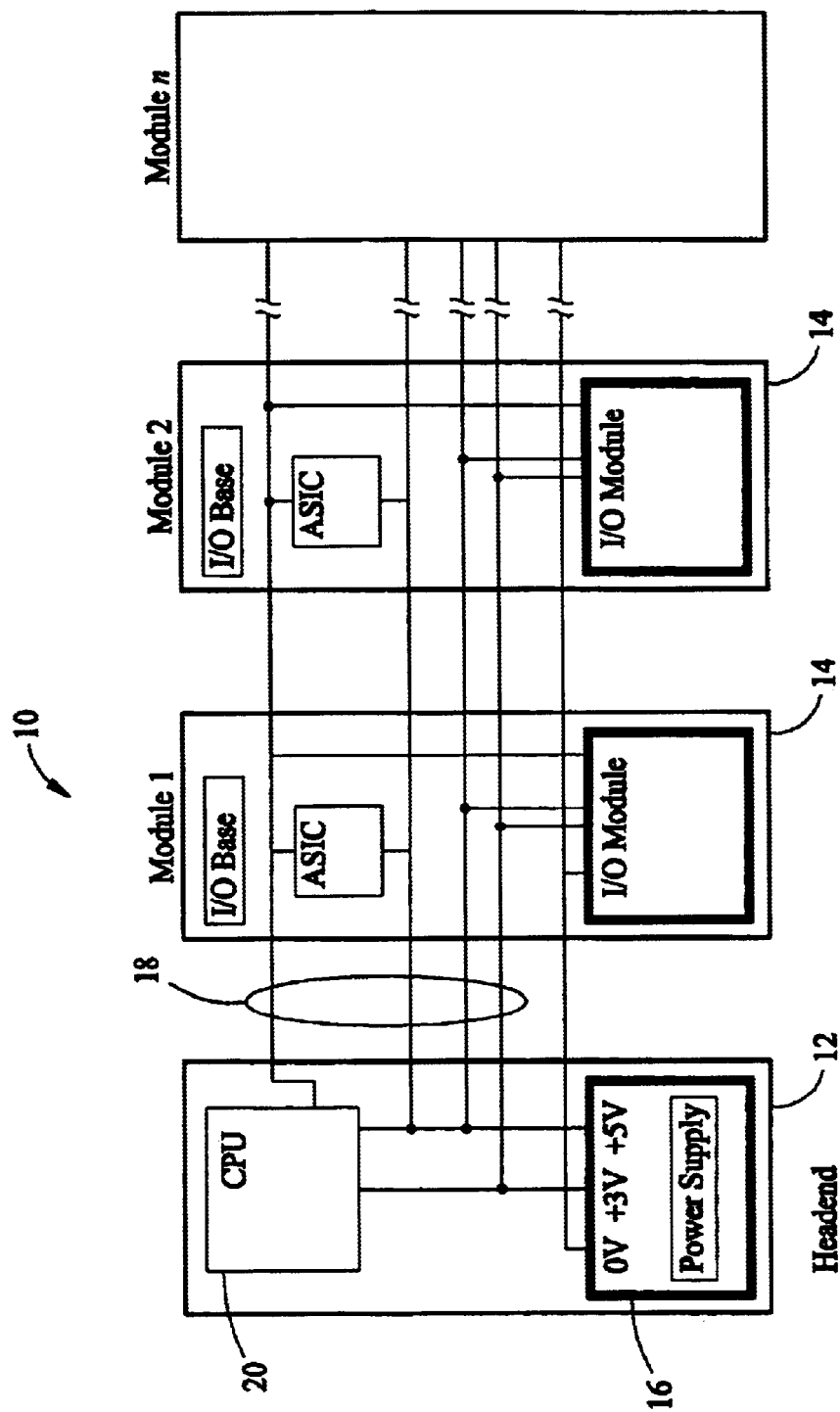
FIG. 1 is a schematic diagram of an electronic system.

FIG. 1 is a schematic illustration of an exemplary electronic system 10 including a main module 12 and two input/output (I/O) modules 14. Although two I/O modules 14 are shown, more can be provided. Main module 12 includes a power supply 16, which supplies power for main module 12 and I/O modules 14. A backplane 18, which includes electrical pathways for communication of various control and data signals, such as those signals originating from central processing unit (CPU) 20 facilitate communication between main module 12 and I/O modules 14.

One use of system 10 is in industrial process controls. A main program, for example, is loaded onto memory (not shown) within main module 12 and executed on CPU 20. I/O modules 14 perform control functions such as monitoring and supplying of signals to external devices (not shown) in order to monitor a process or a control application. I/O modules 14 are configured to perform diverse applications and certain I/O modules 14 are configured to execute internal programs. A program block for execution in an electronic system 10 is typically written in a programming language and debugged on a development system (not shown) and then downloaded to memory (not shown) in an electronic system 10 in order to run as a part of a particular application. In most programming applications, an application program includes multiple programming blocks that are executed separately under control of a main program block.

In a system, such as system 10, program blocks are continually undergoing changes and updates. It is desired that some of these updates take place without suspending execution of all program blocks. Run Mode Store is a capability that allows a user to add, remove, or replace program blocks while electronic system 10 is in a Run mode, e.g. while the application is executing. A microcycle mode is a Run Mode Store feature in which a time allocation is set aside for execution of software routines. Time allocation for program execution is referred to as a microcycle sweep. As a microcycle sweep or time allocation comes to an end, and if any program blocks are still executing at the end of the time allotted for execution, these program blocks are suspended. As a next microcycle sweep begins, the routine restarts execution where it left off as a next slot of time or microcycle sweep is allocated.

Figure 2:
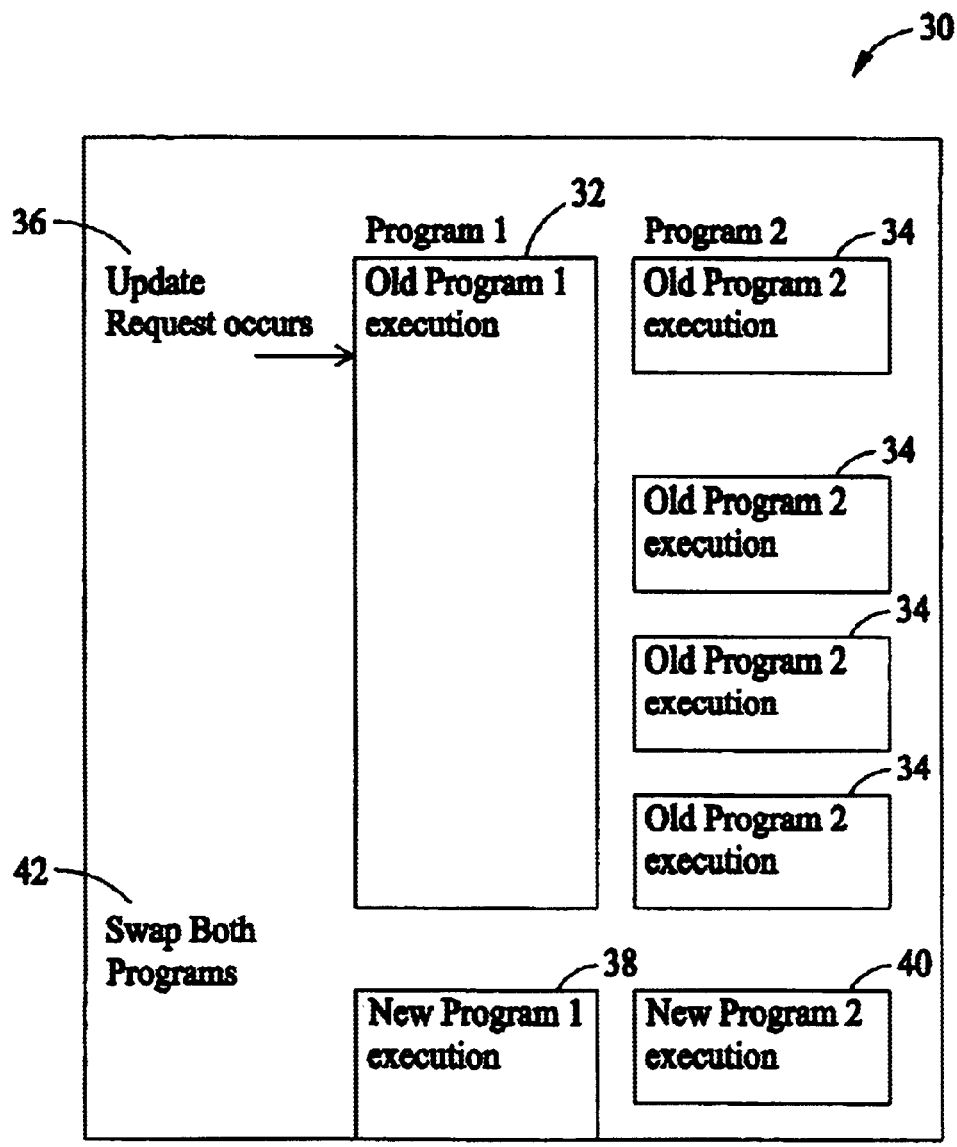
FIG. 2 is a diagram depicting a Run Mode Store of two program blocks in an electronic system.

FIG. 2 is a program execution diagram 30 depicting a Run Mode Store embodiment, in electronic system 10 (shown in FIG. 1), using two program blocks. In diagram 30, program one 32 and program two 34 are executing when update request 36 occurs. As shown in diagram 30, program two 34 may execute multiple times while program one 32 is executing once. To update electronic system 10 with a different version of either program one 32 or program two 34, or both, electronic system 10 has to be at a predefined point in time where all programs have completed execution or are between executions. When neither program one 32 nor program two 34 are executing or are between executions, electronic system 10 allows an update of one or both programs. As depicted in FIG. 2, new program one 38 and new program two 40 begin execution after both programs are updated 42. Since all programs are updated at one time, programs that interact with each other, such as those programs which share data, are not affected. If electronic system 10 determines there is no point in time where none of the program blocks are executing, the Run Mode Store request is rejected.

Figure 3:
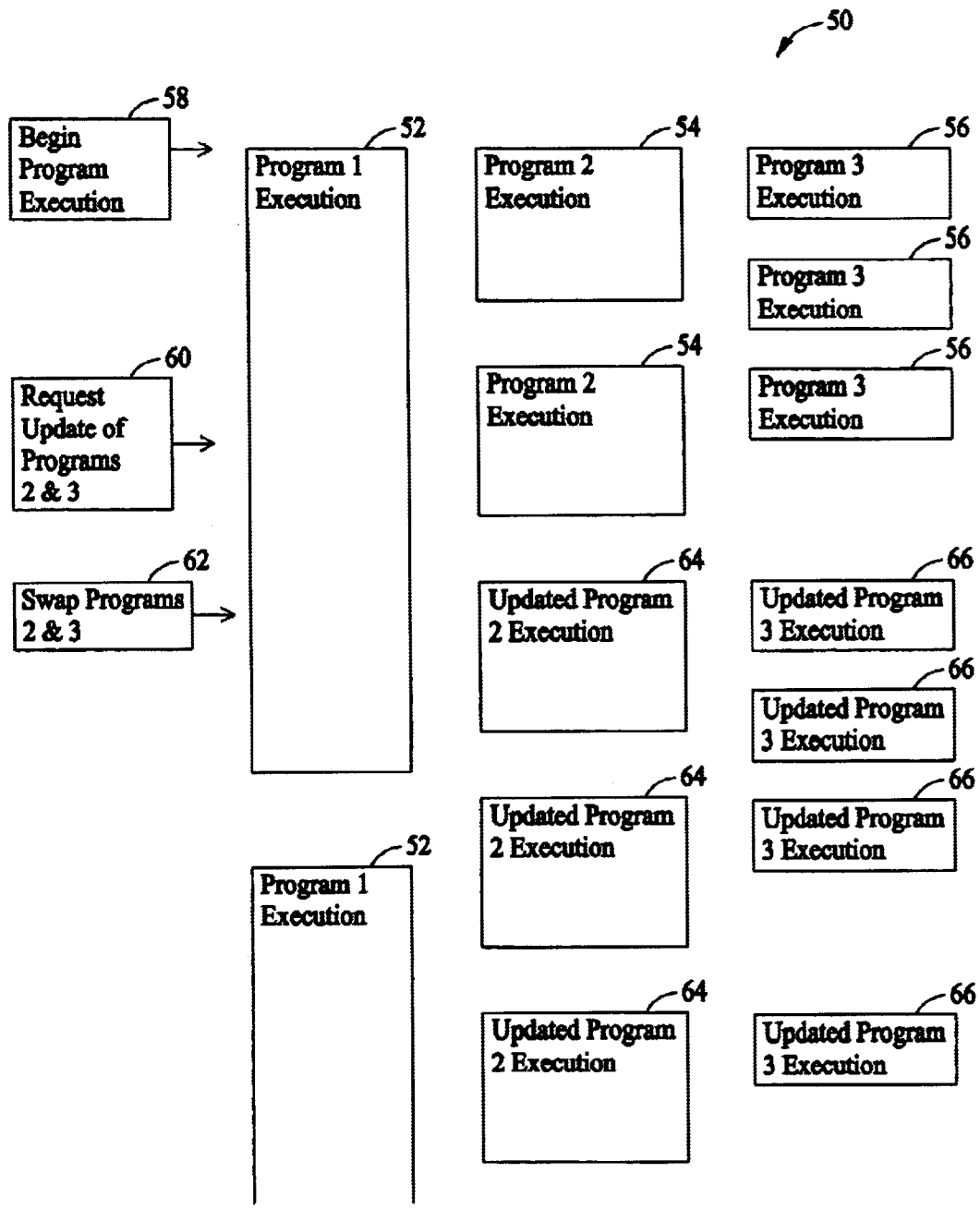
FIG. 3 is a diagram depicting a Run Mode Store in microcycle mode.

Referring to FIG. 3, another embodiment of a Run Mode Store diagram 50, is shown. Diagram 50 depicts a Run Mode Store in microcycle mode. In the embodiment depicted in FIG. 3, a Run Mode Store is allowed only when the programs that are to be updated as a result of the Run Mode Store request are between executions. Within electronic system 10, an operating system maintains a list of currently executing programs. When electronic system 10 receives a request to perform a Run Mode Store, the operating system first determines if any of the programs to be updated in the Run Mode Store are currently executing.

To illustrate, in diagram 50, program one 52, program two 54, and program three 56 begin execution 58 at a first point in time. As shown in diagram 50, program two 54 and program three 56 may execute multiple times while program one 52 is executing a single time. After system 10 determines that an updated version of program two 54 and program three 56 is desired, a Run Mode Store update request 60 is received by CPU 20. The operating system then determines if any of the programs marked for update in Run Mode Store request 60 are currently executing. A Run Mode Store in microcycle mode, allows program two 54 and program three 56 to be swapped 62 with updated program two 64 and updated program three 66 without program one 52 having finished execution. If no programs involved in Run Mode Store request 60 are currently executing, the operating system will process request 60 immediately, otherwise request 60 is postponed until all programs involved in request 60 have finished, and are between, execution cycles. As each program completes its execution cycle, the operating system determines how many, if any, of the programs slated for updating are still executing. When the operating system determines that a Run Mode Store may proceed, the operating system swaps 62 the programs to be updated. The time allocation technique of microcycle mode does not require predefined points in time where no program blocks are executing. Updated program two 64 and updated program three 66 begin execution before one cycle of program one 52 has been completed. After the Run Mode Store is completed, the operating system resumes execution of the programs. As depicted in FIG. 3, more Run Mode Store requests are successful than in the embodiment described in FIG. 2, as only those programs involved in the Run Mode Store are between executions to allow updating.

Figure 4:
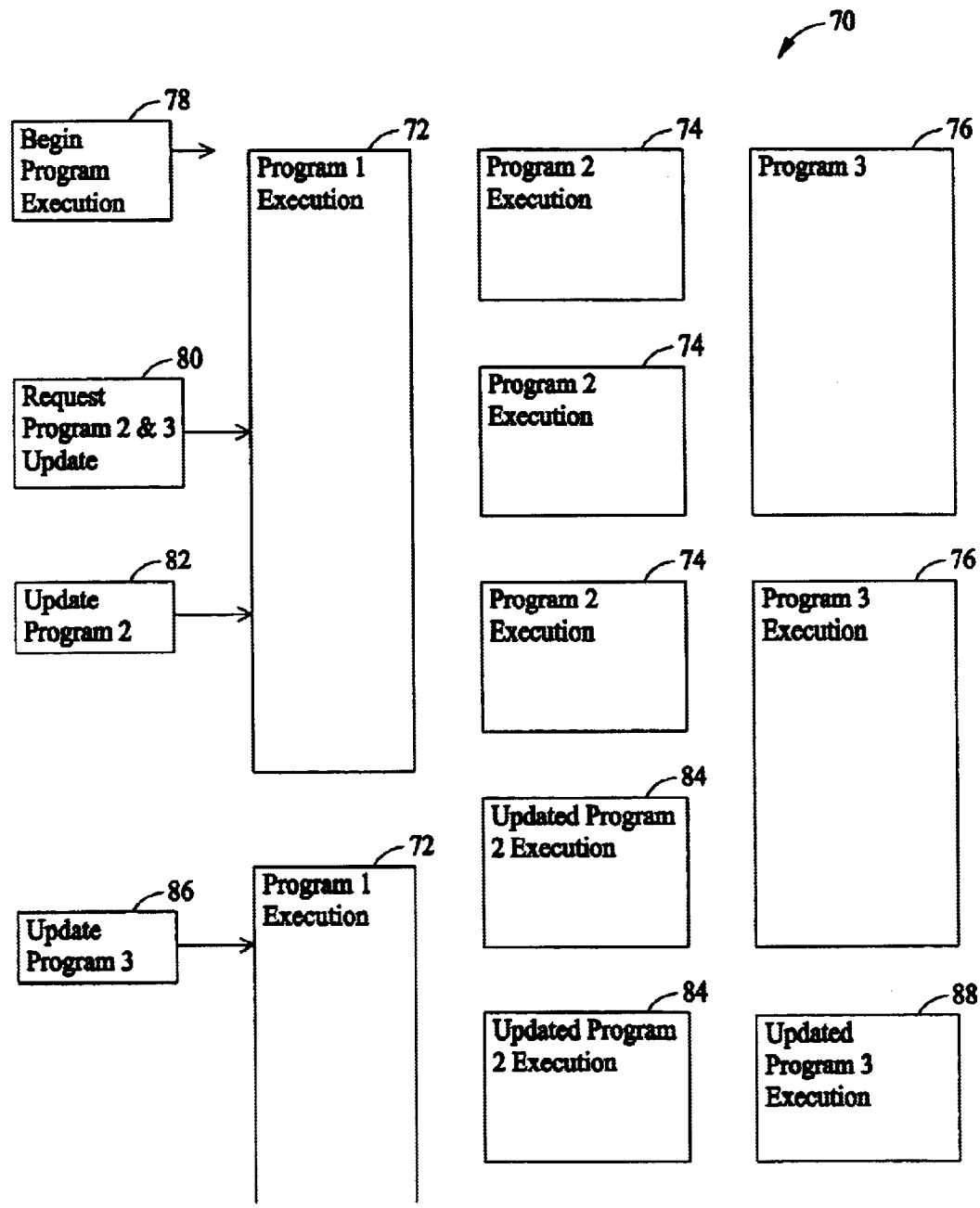
FIG. 4 is a diagram depicting an alternative embodiment of a Run Mode Store in microcycle mode.

An alternative Run Mode Store program execution diagram 70 in microcycle mode is depicted in FIG. 4. In this embodiment, each individual program can be added, deleted or swapped as it completes execution, even while other programs are executing. For each program being replaced or deleted, the operating system determines if that program is currently executing. If the program being swapped or deleted is not executing, that program is immediately replaced, added, or deleted. Those programs that are currently executing, are flagged for processing later, when those individual programs complete their execution.

In diagram 70, program one 72, program two 74, and program three 76 begin execution 78 at a first point in time. Also shown in diagram 70 is that program two 74 and program three 76 may execute multiple times while program one 72 is executing a single time. After system 10 determines that an updated version of program two 74 and program three 76 are needed, a Run Mode Store update request 80 is received by CPU 20 (shown in FIG. 1) and the operating system determines if program two 74 is currently executing. A Run Mode Store in microcycle mode, allows program two 74 to be updated 82 with updated program two 84 as soon as program two 74 has completed its current execution. Also as depicted in FIG. 4, as soon as program three 76 has finished execution, program three 76 is updated 86 with updated program three 88 which then begins execution. After a Run Mode Store update is complete for a program block, the operating system resumes execution of that program block.

The above embodiments provide system users and programmers flexibility for programmatic updates of a system, even while the system is running. This feature allows updates to be implemented without shutting down the system for installation of program updates.

While the invention has been described in terms of various specific embodiments, those skilled in the art will recognize that the invention can be practiced with modification within the spirit scope of the claims.

What is claimed is:

1. A method of implementing program updates for at least one program executing within an electronic system during substantial continued system execution, said method comprising the steps of:
   requesting the electronic system to accept an update of at least one of multiple programs executing within the electronic system for multiple times without ceasing execution of the multiple programs;
   determining if at least one of the multiple programs requested to be updated is executing when the electronic system is requested to accept an update of each of the multiple programs to be updated; and
   loading at least one replacement program to fulfill the request to accept an update of each of the multiple programs to be updated.

2. A method in accordance with claim 1 wherein said step of requesting the electronic system to accept an update of at least one of multiple programs comprises the step of requesting the electronic system to perform a Run Mode Store of each of the multiple programs to be updated.

3. A method in accordance with claim 2 wherein said step of requesting the electronic system to perform a Run Mode Store of each of the multiple programs to be updated comprises the step of requesting the electronic system to delete a program.

4. A method in accordance with claim 2 wherein said step of requesting the electronic system to perform a Run Mode Store of each of the multiple programs to be updated comprises the step of requesting the electronic system to add a program.

5. A method in accordance with claim 2 wherein said step of requesting the electronic system to perform a Run Mode Store of each of the multiple programs to be updated comprises the step of requesting the electronic system to swap one program for another.

6. A method in accordance with claim 1 wherein said step of loading at least one replacement program comprises the step of waiting for a time when all programs within the system are not executing.

7. A method in accordance with claim 1 wherein said step of loading at least one replacement program comprises the step of waiting for a time when all programs slated for updating within the electronic system are not executing.

8. A method in accordance with claim 1 wherein said step of loading at least one replacement program comprises the step of waiting for each program slated for updating within the electronic system to finish executing.

9. A method in accordance with claim 1 wherein said step of requesting the electronic system to accept an update of at least one of multiple programs comprises the step of maintaining a list of programs that are currently executing.

10. A method in accordance with claim 1 wherein said step of requesting the system to accept an update of at least one of multiple programs comprises the step of flagging programs that are currently executing for later processing.

11. A method in accordance with claim 1 wherein said loading at least one replacement program comprises loading the at least one replacement program during a repetition of execution of remaining of the multiple programs.

12. A method in accordance with claim 1 wherein said loading at least one replacement program comprises loading the at least one replacement program during a continuous repetition of execution of remaining of the multiple programs.

13. A method in accordance with claim 1 wherein said loading at least one replacement program comprises performing one of an addition and a deletion operation on each of the multiple programs to be updated.

14. An electronic system comprising a controller, said electronic system including a memory, a backplane, and a plurality of modules connected to the controller via said backplane, an operating system, and multiple program blocks configured to execute multiple times, said controller configured to receive a request to update at least one of the multiple program blocks without ceasing execution of the multiple program blocks executing within the electronic system, said controller configured to store within said memory a control program configured to operate in a microcycle mode for updating at least one of the multiple program blocks on receiving the request, said control program configured to determine if at least one of the multiple prop-ram blocks is executing when the request is received.

15. An electronic system according to claim 14 wherein said controller is further configured to request the electronic system to accept a program update and load at least one replacement program for execution.

16. An electronic system according to claim 14 wherein said controller is further configured to request the electronic system to perform a Run Mode Store of each of the multiple program blocks to be updated.

17. An electronic system according to claim 16 wherein said controller is further configured to request the electronic system to delete a program.

18. An electronic system according to claim 16 wherein said controller is further configured to request the electronic system to add a program.

19. An electronic system according to claim 16 wherein said controller is further configured to request the electronic system to swap one program for another.

20. An electronic system according to claim 14 wherein said controller is further configured to wait for a time when all programs within the system are not executing.

21. An electronic system according to claim 14 wherein said controller is further configured to wait for a time when all programs slated for updating within the electronic system are not executing.

22. An electronic system according to claim 14 wherein said controller is further configured to wait for each program slated for updating within the electronic system to finish executing.

23. An electronic system according to claim 14 wherein said controller is further configured to maintain a list of programs currently executing.

24. An electronic system according to claim 14 wherein said controller is further configured to flag programs currently executing for later processing.

25. An electronic system according to claim 14 wherein said controller is configured to load at least one replacement program block to fulfill the request, and said controller is configured to load the least one replacement program block during a repetition of execution of remaining of the multiple program blocks.

26. An electronic system according to claim 14 wherein said controller is configured to load at least one replacement program block to fulfill the request, and said controller is configured to load the least one replacement program block during a continuous repetition of execution of remaining of the multiple program blocks.

27. An electronic system according to claim 14 wherein said controller is configured to perform one of an addition and a deletion operation on each of the multiple program blocks to be updated to fulfill the request.

* * * * *